March 29, 1960 T. H. BONN ET AL 2,931,015

DRIVE SYSTEM FOR MAGNETIC CORE MEMORIES

Filed June 16, 1955 3 Sheets-Sheet 1

INVENTORS
THEODORE H. BONN
JOSEPH D. LAWRENCE, JR.
WILLIAM J. BARTIK

BY Charles C. English

AGENT

March 29, 1960 T. H. BONN ET AL 2,931,015

DRIVE SYSTEM FOR MAGNETIC CORE MEMORIES

Filed June 16, 1955 3 Sheets-Sheet 2

INVENTORS
THEODORE H. BONN
JOSEPH D. LAWRENCE, JR.
BY WILLIAM J. BARTIK

Charles C. English
AGENT

DRIVE SYSTEM FOR MAGNETIC CORE MEMORIES

Filed June 16, 1955 3 Sheets-Sheet 3

INVENTORS
THEODORE H. BONN
JOSEPH D. LAWRENCE, JR.
BY WILLIAM J. BARTIK
Charles C. English
AGENT United States Patent Office 2,931,015
Patented Mar. 29, 1960

2,931,015

DRIVE SYSTEM FOR MAGNETIC CORE MEMORIES

Theodore H. Bonn and Joseph D. Lawrence, Jr., Philadelphia, and William J. Bartik, Hatboro, Pa., assignors to Sperry Rand Corporation Application June 16, 1955, Serial No. 516,016

22 Claims. (Cl. 340—174)

The present invention relates to switching systems, and more particularly relates to memory arrays utilizing a plurality of magnetic cores in conjunction with improved means for selectively driving said cores to store information therein and to selectively reproduce it therefrom at a subsequent time.

Matrices of magnetic cores are known at the present time for providing storage of information, particularly of the binary digital type. In general, such matrices include a plurality of magnetic cores capable of assuming selectively one of two predetermined significances; and information may be "written into" and/or "read out" of such core elements by preselecting two substantially independent inputs uniquely coupled to a core in question.

In general, such matrices require drive means for selectively passing currents through selected windings on core elements, and in the past, such drive systems have ordinarily taken the form of vacuum tube systems. These known forms of drive have accordingly been subject to the disadvantages that they are relatively bulky, expensive, fragile, and often unreliable, giving rise to serious problems of operating failure and maintenance. Other forms of drive systems have been suggested to obviate the foregoing disadvantages, and one such alternative form utilizes magnetic amplifiers.

The present invention is primarily concerned with this latter form of drive and, in particular, relates to drive systems preferably employing bidirectional magnetic amplifiers whereby driving current may be coupled selectively to a magnetic core memory in either of two selected directions.

It is therefore an object of the present invention to provide an improved magnetic switching system.

A further object of the present invention relates to the provision of improved drive systems for memory devices.

A still further object of the present invention relates to improved magnetic amplifier drive systems for use with memory devices.

A still further object of the present invention resides in the provision of a drive system which may be made in smaller sizes and which is more rugged, less expensive, and less subject to operating failures than has been the case in other drive systems known heretofore.

A still further object of the present invention resides in the provision of improved magnetic core memories having better operating characteristics than has been the case heretofore.

A still further object of the present invention resides in the provision of an improved magnetic core memory system utilizing magnetic amplifier drive means.

In accordance with the present invention core matrices of types generally well known in the art, may be driven selectively by magnetic amplifier devices. Such devices may in turn take the form of bidirectional parallel magnetic amplifiers, for at least a portion of the drive utilized, and such amplifiers, the specific operation of which will be discussed more fully subsequently, are characterized by the fact that output currents in either of two opposing directions may be effected through a control winding carried, for instance, by a selected memory core or cores.

In accordance with preferred embodiments of the present invention, such a bidirectional amplifier may be provided for driving a first end of each of a plurality of meemory drive lines, and the other ends of these drive lines may in turn be coupled to magnetic switching devices which are preconditioned to permit or inhibit the flow of current therethrough. In the subsequent discussion, a drive system will be described with respect to drive lines in one orientation only (such as the vertical drive lines associated with a given memory core matrix), and it is to be understood that further drive means, for instance of the type to be described, may be provided for selectively providing horizontal drive for the given core memory.

The foregoing objects, advantages, construction and operation of the present invention will become more readily apparent from the following description and accompanying drawings, in which.

Figures 1, 1A:
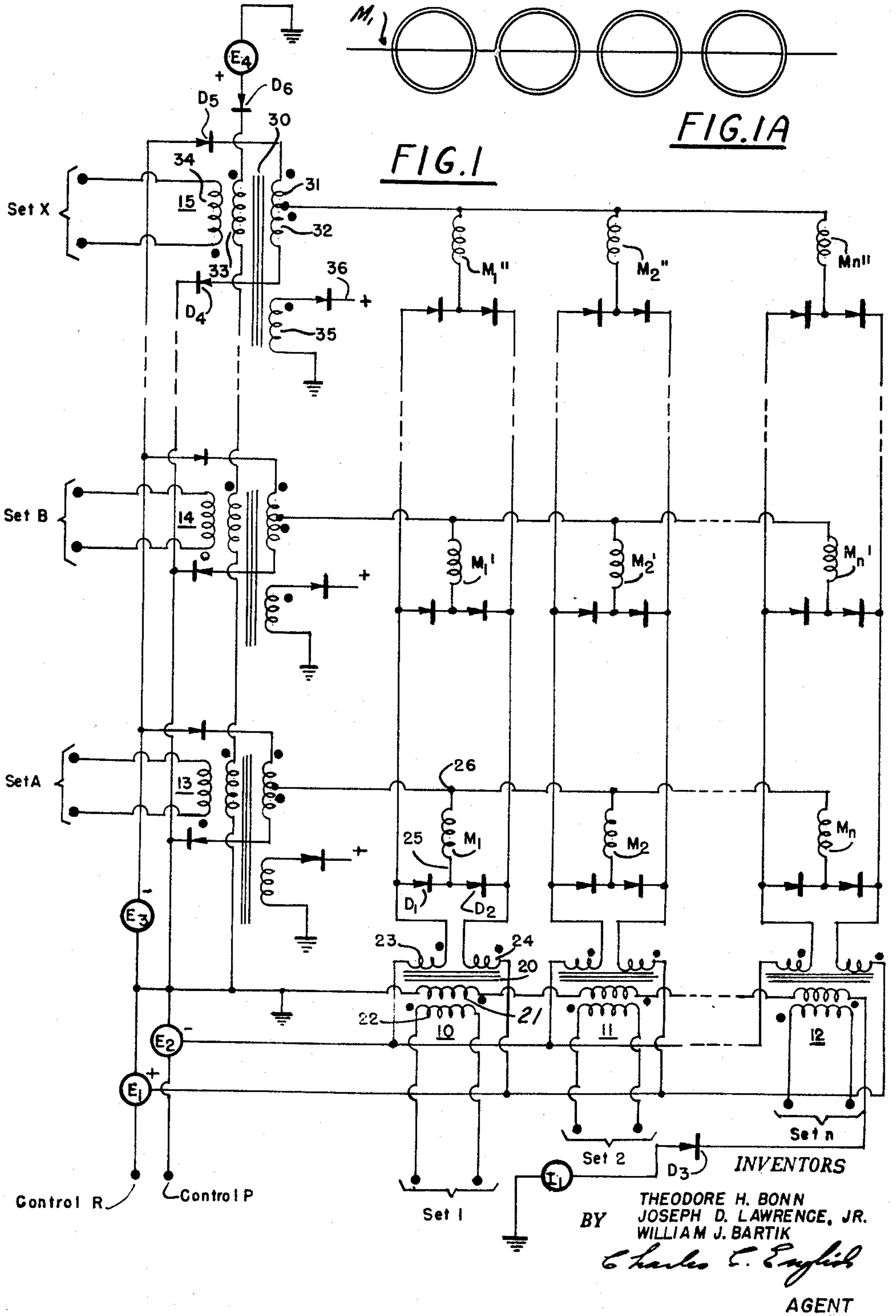
Figure 1 is a schematic representation of one orientation of a core matrix employing the novel drive system of the present invention.
Figure 1A is a schematic representation of a magnetic core line in a magnetic matrix and the drive line therefor.

Referring now to Figure 1, it will be seen that, in accordance with the present invention, a magnetic amplifier drive system may be employed for selectively driving a plurality of memory lines $M_1$, $M_2$ . . . $M_n$; $M_1'$, $M_2'$ . . . $M_n'$; $M_1''$, $M_2''$ . . . $M_n''$. In Figure 1A there is shown an example of a conventional memory line that includes but a few cores by way of illustration. In accordance with one embodiment of the present invention for instance, there may be 32 such memory lines, whereby there may be eight bidirectional magnetic switches controlling one end of these lines and four bidirectional magnetic amplifiers driving the other ends of the 32 memory lines. It must be understood, however, that the concepts of the present invention may be employed for the driving of as many memory lines as may be desired in a given memory system. Each vertical array of memory lines $M_1$, $M_1'$ . . . $M_1''$, for instance may be driven by a bidirectional parallel magnetic amplifier such as the amplifier 10, and a plurality of such amplifiers, 10, 11, 12, etc. may be supplied for respectively driving each of the said vertical arrays. The memory lines are further coupled to magnetic switches 13, 14, 15, etc. in horizontal directions whereby, by proper selection of a given bidirectional parallel magnetic amplifier and a given magnetic switch, a preselected memory line may be driven.

Bidirectional parallel magnetic amplifiers such as 10, 11 and 12, may take the form described for instance in copending application of Joseph D. Lawrence, Jr., U.S.

2,809,302, for: "Bidirectional Parallel Magnetic Amplifier," this copending application having been assigned to the assignee of the present application. Such an amplifier may comprise a core 20 of magnetic material, preferably, but not necessarily, exhibiting a substantially rectangular hysteresis loop. Such cores may be formed of materials such as 4–79 Molypermalloy, or Orthonik, and are generally well known in the art.

The core 20, for instance carries a drive winding 21, at least one set winding 22, and a pair of output windings 23 and 24 thereon; and the operation of the device is such that output potentials will be produced across the output windings 23 and 24 provided a set pulse is applied to the set winding 22 prior to the subsequent application of a drive current, for instance from a source $I_1$, to the drive winding 21. The output windings 23 and 24 are coupled at one of their ends, as shown, via rectifiers D1 and D2, for instance to one end of a load impedance which, in the example shown in Figure 1, may comprise a memory line $M_1$; and the other ends of the said output windings 23 and 24 are coupled respectively to gate pulse sources E2 and E1. The said gate pulse sources E2 and E1 are in turn coupled to sources of control potential designated "Control P" and "Control R," and the gate pulse sources E1 and E2 are so arranged that one only of them permits the passage of current therethrough for a given state of control inputs. Gate pulse source E2 may produce outputs of the form shown in Figure 2D, comprising selective negative-going pulses or potentials from a base level of zero, while the source E1 may in turn selectively produce an output of the form shown in Figure 2E, comprising positive-going pulses or potentials from a base level of zero. As is illustrated in Figures 2D and 2E, the outputs of the sources E2 and E1 are mutually exclusive, whereby one only of the rectifiers D1 and D2 for instance, may pass a current when output potentials appear across the output windings 23 and 24 (assuming, of course, that each of the magnetic switches 13, 14 and 15 are in such a state that current may readily pass therethrough).

Let us assume that the core 20 is initially at its plus remanence operating point. Upon application of a driving current pulse from the source $I_1$ (Figure 2A), the said core 20 will be driven from the said plus remanence operating point into its positive saturation region. Inasmuch as the core 20 is assumed preferably to exhibit a substantially rectangular hysteresis loop, this state of operation produces relatively little flux change in the core, whereby substantially no output potential appears across either of the output windings 23 or 24, and no current passes through the memory line $M_1$, for instance. If a "Set 1" input should be applied to the set winding 22 prior to application of such a current-driving pulse from the source $I_1$, however, the core 20 for instance, will be driven from its plus remanence operating point to its minus remanence operating point, and the next current drive pulse from the source $I_1$ will now drive the said core from its minus remanence operating point to its plus remanence operating point. Inasmuch as the core 20 operates along a substantially vertical portion of its hysteresis loop for this assumed state of operation, a relatively large flux change will be effected in the said core, whereby potentials are induced in each of the output windings 23 and 24 of proper polarity to effect conduction through each of the rectifiers D1 and D2.

Which of these rectifiers D1 and D2 for instance, will actually be in a conductive state for this latter assumed state of operation is dependent, however, upon the respective output conditions of the gate pulse sources E1 and E2; and if it should be assumed for instance, that the source E1 is producing a positive-going potential while the source E2 is substantially at ground potential during this time interval, the rectifier D1 will conduct, permitting current flow through the memory line $M_1$, for instance, from the point 25 to the point 26. If, on the other hand, the source E1 is at substantially zero output potential while the source E2 is producing a negative output for this assumed drive condition, the rectifier D2 only will be conductive, permitting current to flow through the memory line $M_1$, for instance, from the point 26 to the point 25. Thus, the bidirectional magnetic amplifier 10 for instance, operates in such a manner that current will tend to flow through each of the memory lines $M_1, M_1' \ldots M_1''$ in either of two opposing directions, subsequent to application of a "Set 1" input thereto, and dependent upon the output state of the two gate pulse sources E1 and E2. It is to be understood, of course, that the bidirectional magnetic amplifiers 11, 12, etc. operate in the foregoing manner as well.

The gate pulse sources E1 and E2 may take the form of known permissive and/or inhibition type gates, and the form of the Control P and Control R pulses will depend upon the type of gate selected. In addition, other forms of gate pulse sources may be utilized for the sources E1 and E2, and one form of such gate pulse source has been described in the above identified copending application.

Summarizing the foregoing, it will be seen that each of the vertical arrays $M_1, M_1' \ldots M_1''$; $M_2, M_2', M_2''$; and $M_n, M_n'$ and $M_n''$, is selectively driven by a bidirectional parallel magnetic amplifier. Such amplifiers produce substantially no output in the absence of a set input thereto; and such amplifiers, assuming a set input has been applied, may effect current flow in either of two directions through its load impedance (in this case the memory lines), in dependence upon a preselected output state for the gate pulse sources E1 and E2. As has been mentioned previously, a current source $I_1$ is employed for driving each of the drive windings of the several bidirectional parallel magnetic amplifiers, and therefore these drive windings may be connected in series, as shown, to the common current pulse source $I_1$.

Figure 2:
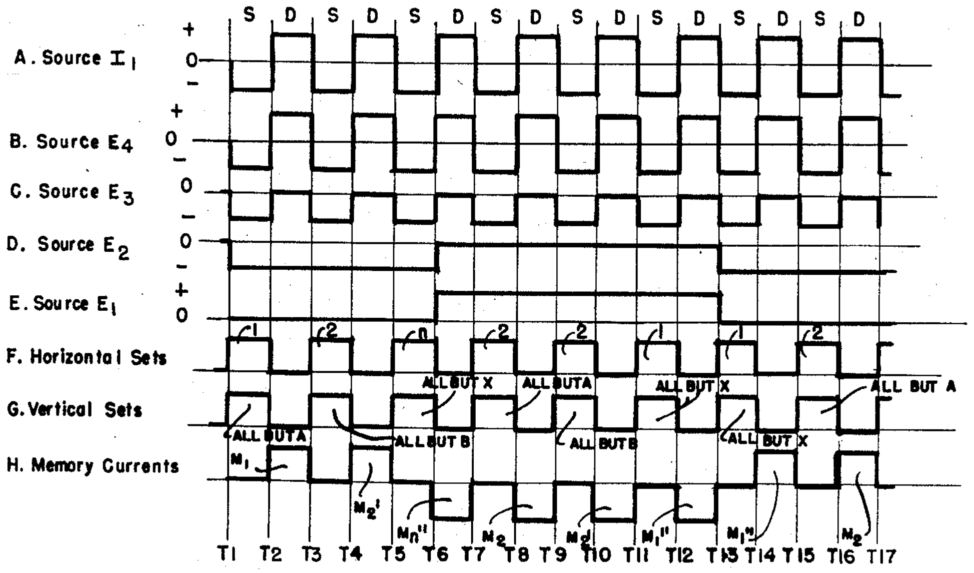
Figure 2 (A through H) are waveform diagrams illustrating the operation of the circuit shown in Figure 1 for an assumed configuration of controlling inputs.

In operation, the current pulse source $I_1$ may effect current pulses of the configuration shown in Figure 2A, comprising regularly alternating negative and positive-going output pulses; and the output of the said source $I_1$ may be coupled to the several drive windings of the several bidirectional parallel magnetic amplifiers via a rectifier D3. The operating time of the drive system is preferably divided into alternate set periods and drive periods, and these time intervals have been designated by the letters S and D, appearing in Figure 2. During each of the drive periods the pulse source $I_1$ effects a positive-going output which may be coupled, via the rectifier D3, to each of the drive windings of the several bidirectional parallel magnetic amplifiers, thereby to permit any one or more of the said bidirectional parallel magnetic amplifiers, which has had a set input applied thereto immediately preceding a drive time interval, to effect an output potential across its corresponding output windings. During each of the set time intervals, the source $I_1$ produces a negative-going blocking voltage which serves to disconnect the rectifier D3 thereby to prevent undesired loading of amplifiers by the source $I_1$ during the several set time intervals. In this respect, of course, the negative blocking pulse portions of the source $I_1$, as well as the rectifier D3, may be dispensed with, provided the source $I_1$ is of sufficiently high impedance to prevent the aforementioned undesirable loading.

In addition to the above described parallel magnetic amplifier drive coupled to one end of each of the vertical arrays of memory cores, the said memory cores are further coupled along a plurality of horizontal lines to the magnetic switches 13, 14, 15, etc., mentioned previously. Such switches may comprise respectively a magnetic core 30, again preferably but not necessarily, exhibiting a substantially rectangular hysteresis loop; and the said core 30, for instance may carry a pair of output windings 31 and 32, a drive winding 33 and a set winding 34 thereon.

The output windings 31 and 32 may comprise a single center-tapped winding, or may comprise two separate windings, as shown, coupled to one another and to the horizontal drive lines respectively. The other ends of the said output windings 31 and 32 are coupled to rectifiers D4 and D5 for instance, and the several drive windings 33, etc. may be connected in series to one another and to a voltage source E4, via a further rectifier D6.

The operation of the magnetic switches 13, 14, 15, etc., is somewhat analogous to that given previously for the several bidirectional parallel magnetic amplifiers. Thus, if it should be assumed that the core 30 for instance, is initially at its plus remanence operating point, upon application of a positive-going output pulse from the source E4 the said core 30 will be driven from its said plus remanence operating point into the region of positive saturation. For this state of operation, relatively little voltage will be induced in the output windings 31 and 32, whereby substantially no back voltage is applied to the rectifiers D5 and D4 and these rectifiers will be in a conductive state, respectively, for currents of preselected and opposite directions.

If, on the other hand, a set input should be applied to the set winding 34 for instance, prior to application of a driving pulse from the source E4, the core 30 for instance, will be driven to its minus remanence operating point whereby application of a next positive-going pulse from the source E4 will drive the said core 30 for instance, from its said minus remanence operating point to its said plus remanence operating point, effecting a relatively large flux change in the core 30 and inducing a relatively large potential in each of the output windings 31 and 32. These output potentials are of such polarity that the rectifiers D4 and D5 for instance, will each be disconnected, thus inhibiting any current flow therethrough. Winding 35 and its clamping rectifier 36 place an upper limit on the voltage induced in all windings of core 30.

In operation, therefore, one of the switches 13, 14, 15, etc. permits current flow therethrough in either of two directions, provided no set input has been applied immediately preceding the application of a drive pulse. The other switches will inhibit such current flows, having been set prior to the application of drive thereto. The pulse source E4 produces output potentials of the type shown in Figure 2B, and these output potentials again comprise alternately negative and positive-going output pulses occurring respectively during alternate set and drive time periods. Again, therefore, the negative-going output from the source E4, during each of the set periods, disconnects the rectifier D6 preventing undesirable loading of the switches by the said source E4, while the positive-going output occurring during each of the drive periods causes each of the several magnetic switches to pass or inhibit current flows depending upon whether or not a set has been applied thereto.

A further pulse source E3, producing regularly occurring negative-going pulses during each of the set time intervals (Figure 2C), is provided, and these negative-going pulses from the said source E3 produce bias voltages which prevent circulating current from flowing in the switch secondaries, 31 and 32 for instance, during set time intervals. In addition, each of the magnetic switches 13, 14, 15, etc. may include a voltage limiting winding, 35 for instance, which may comprise further windings carried by the said cores and coupled respectively via rectifiers 36 to bias potential sources, all as shown. Such voltage limiting windings will serve to prevent the generation of excessive voltages in the several switches 13, 14, 15, etc. and are highly desirable inasmuch as such excessive voltage would be damaging to the rectifiers, for example D4 and D5, and would further cause a given switch to absorb a disproportionate amount of the power from the source E4, leaving insufficient voltage to drive the remaining switches.

In operation, and during each set period, a set input pulse is applied to one of the bidirectional magnetic amplifiers 10, 11, 12, etc. and further set inputs are applied to all but one of the magnetic switches 13, 14, 15, etc. As has been discussed previously, the set input supplied to the selected bidirectional magnetic amplifier causes the said amplifier to effect a substantial output during the next successive drive period, and this output in turn tends to drive current in one of two preselected directions (depending upon the state of the current sources E1 and E2), through each of the memory lines in its associated vertical array. The several set pulses applied to all but one of the magnetic switches 13, 14, 15, etc. inhibit this current flow through all but one of the said memory lines in the selected array, however, whereby a preselected one only of the said memory lines is driven by the foregoing application of set pulses. The several memory lines may comprise a coil carried by a magnetic core memory, preferably exhibiting a substantially rectangular hysteresis loop, or may in the alternative, comprise a plurality of interconnected windings carried by a plurality of such memory cores.

The above described operation will become more readily apparent from a consideration of the waveforms shown in Figure 2. The current source $I_1$ and the potential sources E3 and E4 produce regularly occurring pulsed outputs, as shown in Figures 2A, 2B and 2C, and the functions of these regularly occurring pulses have already been discussed. The Control P and Control R inputs, coupled respectively to the gate pulse sources E2 and E1, are assumed to be such that the source E2 produces a negative potential output during the time intervals *t*1 to *t*6 and *t*13 to *t*17 (Figure 2*d*), while the gate pulse source E1 produces a positive potential output during the time interval *t*6 to *t*13 (Figure 2E). Figure 2F represents symbolically, the set inputs applied to a preselected one of the bidirectional parallel magnetic amplifiers during successive set time intervals, and these set inputs have been designated "Set 1," "Set 2," and "Set *n*." Figure 2G illustrates a further assumed state of set inputs to the several magnetic switches 13, 14, 15, etc. during successive set time intervals, and these further assumed set inputs have been designated respectively "All-but-A," "All-but-B" and "All-but-X," representing simultaneous set inputs to all but the indicated magnetic switch.

If we should assume that during a time interval *t*1 to *t*2, a Set 1 input is applied to the bidirectional parallel magnetic amplifier 10, and further set inputs are applied to all but the magnetic switch 13, the application of driving inputs from the sources $I_1$ and E4, during the next subsequent drive time interval *t*2 to *t*3, will effect a current flow through the memory line $M_1$ only (Figure 2H). This drive has been arbitrarily represented by a positive-going output during the time interval *t*2 to *t*3, and this particular polarity of output arises from the fact that gate pulse source E1 exhibits a zero output potential while gate pulse source E2 exhibits a negative output potential during this time interval. If, now, during a set time interval *t*3 to *t*4, a set input should be applied to the bidirectional amplifier 11, and further set inputs should be applied to all but the magnetic switch 14, a further output drive will be effected through the memory line $M_2'$ during the next subsequent drive time interval *t*4 to *t*5. Again, this further drive through the memory line $M_2'$ has been arbitrarily designated as a positive-going output inasmuch as the comparative output states of the sources E2 and E1 have not changed.

Let us now assume that during a time interval *t*5 to *t*6 a set input *n* is applied to the magnetic amplifier 12, while further set inputs are applied to all but the set X input of magnetic switch 15. If we should further assume that the Control R inputs to the sources E1 and E2 vary so that source E1 produces a positive-going output during the time interval *t*6 to *t*7, drive current will be effected through the memory line $M_n''$, only, during this drive interval $t6$ to $t7$, and this drive current further will be in a direction opposite to that previously effected through the selected memory line. By this operation, therefore, not only can a preselected memory line be driven, but that drive may be in either of two opposing directions.

Further operation of the device illustrated in Figure 1 may be seen from an examination of the waveforms occurring during the time interval $t7$ to $t17$, for the assumed set input states shown in Figures 2F and 2G.

While the foregoing description has been concerned with the operation of the precise circuit shown in Figure 1, it will be appreciated that a number of changes may be made in that circuit and that a number of further embodiments of the invention may be produced without departing from the concepts described. Thus, the system shown in Figure 1 readily lends itself to the use of both parallel and series type amplifiers for driving purposes. In accordance with one such modification, it should be noted that if voltage source E4 and all the windings in series therewith are omitted, and if all of the voltage regulating windings 35 should be omitted, the switches 13 through 15 become simple series type bidirectional magnetic amplifiers. When so modified, the system will still function in all respects precisely as the embodiment described in reference to Figure 1, except that the magnetizing current previously supplied by source E4 now flows through unselected memory lines and through windings such as 31 or 32 of those series amplifiers 13 through 15 which are in a non-conducting state. This small magnetizing current develops a back E.M.F. in coils such as 31 and 32 when they are in the high impedance state and this back E.M.F. in turn opposes the flow of greater current. While it may be undesirable in certain applications to have such a small magnetizing current flowing through the memory, it can be tolerated in small memories and achieves a substantial saving in equipment, i.e. pulse source E4 and its associated windings and diodes need not be used. It will be appreciated that when such a system is utilized, employing series type amplifiers at 13 through 15, the unset amplifier experiences no flux change during the drive period, and thus passes the full memory current in the same manner that the unset switch does in the embodiment illustrated and described in reference to Figure 1.

A still further modification of the Figure 1 system may utilize series bidirectional amplifiers on both edges of the switching matrix. Such a system may be achieved by once more eliminating pulse source E4 its associated windings and the several voltage regulator windings 35, and by also eliminating current source $I_1$ and its associated windings. When so modified the system employing series bidirectional drives on both edges of the switching matrix operates in the manner illustrated by typical waveforms shown in Figure 3.

Figure 3:
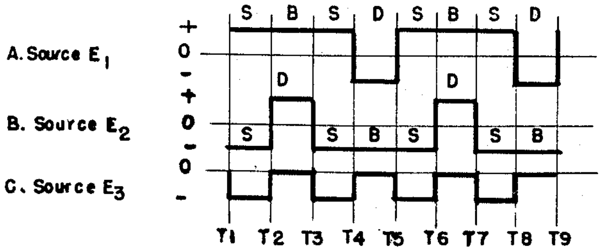
Figure 3 (A through C) are waveform diagrams illustrating the operation of a modified form of the circuit shown in Figure 1.

Thus, referring to Figure 3, and recognizing that the designations "S," and "B" and "D" represent set, block, and drive functions for the several waveforms respectively, it will be seen that during the time interval $t1$ to $t2$ all but one amplifier of the group 10 through 12, etc., are set. Source E1 is positive and source E2 is negative during this time interval to prevent current flow through output windings (windings 23 and 24 on amplifier 10, for instance) during set, because potentials developed across these output windings during set are of such a polarity that they tend to drive current in the low impedance direction through the switching array rectifiers, such as D1 and D2 for instance. During this same time interval $t1$ to $t2$, all but one amplifier of the group 13 through 15 are set. Pulse source E3 is negative in potential to prevent current flow through output windings (such as windings 31 and 32 on amplifier 15 for instance) during this time interval.

During time interval $t2$ to $t3$ (Figure 3), source E2 provides a positive power pulse which tends to drive a regulated current through amplifiers 10 through 12 and thence through memory lines M and amplifiers 13 through 15 to ground. Source E1 remains at a positive potential during this time interval $t2$ to $t3$ to block the current which otherwise would return to ground through E1, thus by-passing the memory lines. Since all but one amplifier of the group comprising amplifiers 10 through 12 were set during the time interval $t1$ to $t2$, all but one of these amplifiers will be in a high impedance state, thus opposing this flow of current. As a result, practically all of the current from source E2 will flow through the single unset amplifier. For this same reason, only one amplifier of the group 13 through 15 will conduct whereby only one of the memory lines will carry current.

During time interval $t3$ to $t4$, all but one of each group of amplifiers are once more set. In the following drive period $t4$ to $t5$, source E1 produces a negative-going power pulse, while source E2 remains negative and thereby blocks. In this way, current is driven through the one selected memory line in a direction opposite to that flowing during the time interval $t2$ to $t3$. By this arrangement, therefore, the switching matrix operates in substantially the manner described in reference to Figure 1 except that series bidirectional amplifiers are employed on both edges of the switching matrix for control drive purposes.

Figure 5:
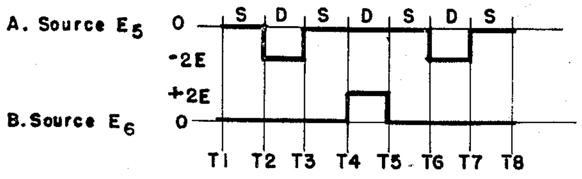
Figure 5 (A and B) are waveform diagrams illustrating the operation of the circuit shown in Figure 4.
Figure 4:
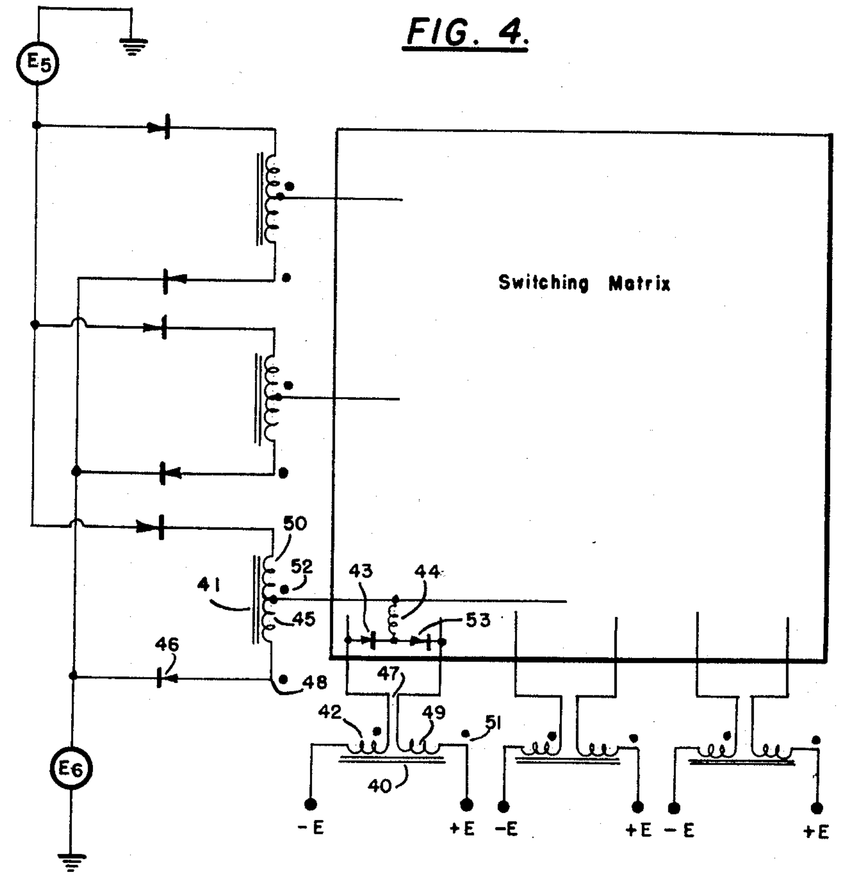
Figure 4 is a schematic representation of one orientation of a core matrix in accordance with a modified form of the present invention.

Still another embodiment of the present invention is illustrated in the arrangement of Figure 4, and in the waveforms of Figure 5. This particular arrangement shown in Figure 4 uses parallel amplifiers on both edges of the switching matrix. Although set and drive windings have not been illustrated they may be the same as has been shown and described in reference to Figure 1. The waveforms for this system are illustrated in Figure 5 and it will be seen that during the set period $t1$ to $t2$, one amplifier on the horizontal edge of the switching matrix and one amplifier on the vertical edge of the said switching matrix are set. During the drive period these are the only amplifiers that will have an output. Thus, the memory line which is disposed at the intersection of those drive lines in the switching matrix coupled to set amplifiers will be the only memory line that conducts current.

Either source E5 or source E6 provides a blocking pulse during drive to determine the direction of current through the memory. For example, if source E5 should be negative in polarity, current must flow upward through the memory. Moreover, if amplifiers 40 and 41 were set during the preceding set period, then voltages will be induced in windings 42, 45, 49 and 50 and these voltages will have such polarities that coil ends 47, 48, 51 and 52 are positive. This will cause current to flow from source −E, through coil 42, and thence through rectifier 43 and memory line 44 in an upward direction. From here, the current flows through coil 45, rectifier 46 and source E6 to ground. The negative pulse from source E5 prevents the flow of current in coils 49 and 50, thus assuring the aforedescribed direction of current flow through the memory.

In a like manner, current may be driven through the memory in an opposite direction by causing pulse source E5 to have a substantially zero output potential, while source E6 is positive in output potential. In this particular case, current will flow through source E5, coil 50, memory line 44 and coil 49, whereby current flows in a downward direction through memory line 44.

It should be noted that in the embodiment of Figure 4, the maximum voltage that can be induced in the several output coils (such as 42, 45, 49 and 50), is limited by the voltages to which these coils are returned. For example, the negative end of coil 42 is connected to a source −E and the positive end of coil 49 is connected to a source +E. The other ends of these two coils are connected together through rectifiers 43 and 53. Thus, the maximum potential which can be induced in the two coils 42 and 49 is 2E, i.e. 1E per coil. The same reasoning applies to amplifier 41 since, during the drive periods, sources E5 and E6 are of such polarity as to limit the potential across coils 45 and 50 to 2E. This makes it unnecessary to use separate voltage regulating coils and diodes, such as those illustrated in Figure 1. It should further be noted that the driving pulses (not shown in Figure 5) for the amplifiers on at least one edge of the array, should be current regulated in order that the pulse through the memory line will similarly be current regulated.

Figure 6:
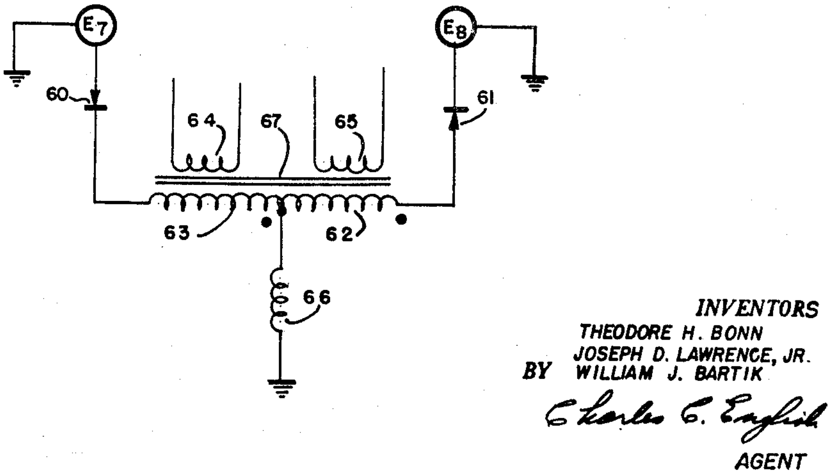
Figure 6 is a schematic representation of a still further embodiment of the present invention.

A still further embodiment of the present invention may utilize a bidirectional amplifier, for instance a parallel bidirectional magnetic amplifier, for driving one end only of a memory line. This particular embodiment of the present invention is extremely simple in structure and one possible configuration thereof is illustrated in Figure 6. Thus, referring to Figure 6, it will be seen that a bidirectional amplifier for driving one end of a memory line may comprise a core of magnetic material 67, a setting means or winding 64, a driving means or winding 65 and two output coils 62 and 63. Pulse sources E7 and E8 provide blocking pulses to determine the direction of current flow in the memory, and such pulse sources may be common to a number of amplifier stages. When source E7 is at zero potential, source E8 is at a positive potential, and current through driving coil 65 drives core 67 through a high permeability region of its hysteresis loop whereby current will be driven through source E7 and thence through rectifier 60, coil 63 and memory line 66, in a downward direction. When source E7 is at a negative potential and source E8 is at zero output potential, the switching of core 67 will drive current through memory line 66 in an opposite direction, that is from ground, through memory line 66, and thence through winding 62, rectifier 61 and source E8, whereby current flows in an upward direction through memory line 66. It should be noted that the voltage developed across coils 62 and 63 in this particular embodiment of the invention is limited to the difference in potential between sources E7 and E8.

While the arrangement of Figure 6 utilizes a parallel bidirectional magnetic amplifier for driving one end of a memory line, it will also be appreciated that, in accordance with the discussion of the other embodiments of the present invention, a series type bidirectional magnetic amplifier may be employed for driving one end of such a memory line. This particular form of the present invention may be effected by eliminating driving coil 65 in the arrangement of Figure 6. The waveforms of Figure 7 illustrate typical operation of such a series type bidirectional amplifier for driving one end of a memory line (modified Figure 6), and once more the designations "S," "B" and "D" represent set, block and drive functions for the several waveforms respectively.

Figure 7:
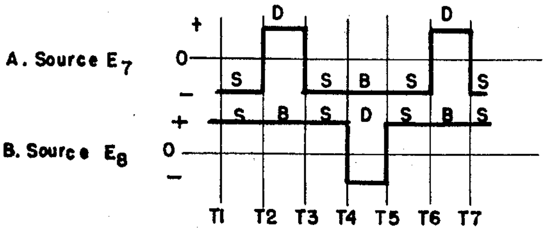
Figure 7 (A and B) are waveform diagrams illustrating the operation of a modification of the circuit illustrated in Figure 6.

Thus, referring to Figure 7, and assuming that the waveforms shown therein are illustrative of the operation of a series type bidirectional amplifier, it will be seen that source E7 is at a negative potential during the several set periods in order to block potentials induced, for instance, in coil 63 during set. At time interval *t2* to *t3*, source E7 tends to drive current in a downward direction through memory line 66. If coil 63 is in a low impedance state, such current will be permitted to flow. If, however, the amplifier was set before the application of a drive pulse from source E7, the coil 63 will be in a high impedance state and current flow will be impeded. During time interval *t2* to *t3*, source E8 must be at a potential at least as high as that of source E7 to prevent current from source E7 from by-passing the memory by flowing through coil 62, rectifier 63 and source E8.

While preferred embodiments of the present invention have been described, it must be understood that many variations and modifications therein will be readily suggested to those skilled in the art and certain of these possible modifications or variations have been described in detail. All such variations as fall within the principles given above are therefore meant to come within the scope of the appended claims; and in this respect, the foregoing discussion is meant to be illustrative only and is not limitative of our invention.

Having thus described our invention, we claim:

1. A switching system comprising a plurality of pulse-type bidirectional magnetic amplifiers each of which has an input and an output winding means, said amplifiers each being selectively responsive to signals applied at its input for effecting an output potential at its output winding means, control means coupled to said plurality of amplifiers for selectively controlling the effective polarity of said output potentials, a plurality of inductive load impedances coupled respectively at one of their ends to said plurality of amplifier output winding means, a plurality of switching means, means coupling the other ends of separate pluralities of said inductive load impedances to one another and to different ones of said switching means, the state of conductivity of said switching means being selectively responsive to control signals selectively applied thereto.

2. The system of claim 1 wherein said switching means comprises a pulse-type magnetic switch.

3. The system of claim 1 wherein said plurality of load impedances comprises a plurality of selecting lines for memory elements in an information storage system.

4. In combination, a load, an amplifier having an input and two outputs, a first circuit comprising one of said amplifier outputs and first rectifier means coupled to one end of said load, a second circuit comprising the other of said amplifier outputs and second rectifier means coupled to said one end of said load, said first and second rectifier means being oppositely poled with respect to said one end of said load, control means coupled to said first and second circuits for applying bias signals to said rectifier means to enable a selected one of said rectifier means to pass output signals produced at the associated one of said amplifier outputs and to bias the other of said rectifier means to block output signals produced at the other of said amplifier outputs thereby rendering said selected one only of said first and second rectifier means conductive upon occurrence of output signals at said first and second amplifier outputs, a pulse responsive switching circuit coupled to the other end of said load, and means for applying coincident pulses to said amplifier input and to said switching circuit thereby to effect a pulse of current flow via said load, said switching circuit, and a selected one of said rectifier means.

5. The combination of claim 4 wherein said switching means includes third and fourth oppositely poled rectifier means coupled to said other end of said load, said switching means being operative to render a selected one of said third and fourth rectifier means conductive in coincidence with conduction of said selected one of said first and second rectifier means.

6. A switching system comprising a bidirectional magnetic amplifier having an input winding and an output winding, said amplifier being selectively responsive to a signal applied at said input for effecting an output potential at said output winding, control means coupled to said amplifier for selectively controlling the effective polarity of said output potential, a plurality of load impedances each coupled at one of its ends to said amplifier output winding, a plurality of magnetic switches coupled respectively to the other ends of said plurality of load impedances, each of said magnetic switches including a core of magnetic material having a control winding, an output winding, and a power winding thereon, means coupling said power windings to one another and to a source of regularly occurring pulses, means for applying control signals to said control windings of selected ones of said plurality of switches, the state of conductivity of said output windings being responsive to the presence or absence of said selective control signals, and separate rectifier means coupled to each of said output windings to receive voltages induced therein, said induced voltages being of a certain magnitude and polarity to control the states of conductivity of said rectifier means whereby the states of conductivity of said rectifier means is selectively responsive to the presence or absence of said selective control signals, the other ends of said load impedances being coupled respectively to said rectifier means.

7. The system of claim 6 wherein said plurality of load impedances comprises a plurality of selecting lines for memory elements in an information storage system.

8. The system of claim 6 in which said bidirectional amplifier comprises a pulse-type magnetic amplifier.

9. A switching system comprising a bidirectional magnetic amplifier having an input winding and a plurality of output windings, said amplifier being selectively responsive to a signal applied at said input winding for inducing oppositely directed signals at terminals of said output windings, magnetic information storage means including a winding means, two rectifiers respectively coupling said output winding terminals to said information winding means and poled to pass effectively currents in opposite directions thereto, and control means coupled to said rectifiers for applying bias signals thereto to enable a selected one of said rectifier means to pass the signal induced at the associated one of said output winding terminals and to bias the other of said rectifier means to block the signal induced at the associated one of said output winding terminals, whereby said information winding means may be energized by current in a selected one of opposing directions via said selected rectifier means in response to operation of said control means.

10. A switching system comprising magnetic amplifier means including a magnetic element means having substantial remanence, input winding means, and a plurality of output winding means, magnetic information translating means including winding means, two rectifiers respectively coupling said output winding means to a common terminal of said information winding means and poled to pass effectively currents in opposite directions thereto, and control means for selectively energizing said input winding means to set the remanent state of said magnetic element means at certain times and for applying pulses to said output winding means at times between said certain times so that said information winding means is energized in a selected direction via one of said rectifiers and not in the other direction in response to operation of said controls means.

11. The system of claim 10 wherein said amplifier comprises a series type magnetic amplifier.

12. The system of claim 10 wherein said amplifier comprises a parallel type of magnetic amplifier.

13. A switching system comprising magnetic amplifier means including magnetic element means having substantial remanence, input winding means, and a plurality of output winding means, magnetic information translating means including winding means, separate unidirectional impedances coupling a terminal of said information winding means to said output winding means, said unidirectional impedances being poled so that said information winding means is energized in respectively opposite directions by said output winding means, means for alternately applying pulses at certain times to said output windings in the forward directions of the respective ones of said unidirectional impedances so as to tend to energize said information winding means in opposite directions respectively, said pulse applying means being connected to another terminal of said information winding means, and means for selectively energizing said input winding means at other times to set the remanent state of said element means to control the passage of said pulses through said output winding means and information winding means.

14. A switching system comprising a plurality of magnetic amplifier means each including magnetic element means, input winding means, and a plurality of output winding means, a plurality of magnetic information translating means each including winding means, separate unidirectional impedances coupling a terminal of each of said information winding means to said output winding means of a different one of said amplifier means, said unidirectional impedances being poled so that each of said information winding means is energized in respectively opposite directions by the associated ones of said output winding means, means for alternately applying energizing signals to said output windings of each of said amplifier means in the forward directions of the respective one of said unidirectional impedances so as to tend to energize the associated one of said information winding means in opposite directions respectively, means for coupling said signal applying means to another terminal of each of said information winding means, and means for selectively energizing said amplifier input winding means to control the passage of said energizing signals through said amplifier output winding means to energize a selected one of said information winding means.

15. A switching system comprising a plurality of magnetic amplifier means each including magnetic element means having substantial remanence, input winding means, and a plurality of output winding means, a plurality of magnetic information translating means each including winding means, separate unidirectional impedances coupling a terminal of each of said information winding means to said output winding means of a different one of said amplifier means, said unidirectional impedances being poled so that each of said information winding means is energized in respectively opposite directions by the associated ones of said output winding means, means for alternately applying energizing signals at certain times to said output windings of each of said amplifier means in the forward directions of the respective one of said unidirectional impedances so as to tend to energize the associated one of said information winding means in opposite directions respectively, means for coupling said signal applying means to another terminal of each of said information winding means, and means for selectively energizing said amplifier input winding means at other times to set the remanent state of said element means to control the passage of said energizing signals through said amplifier output winding means to energize a selected one of said information winding means.

16. A switching system comprising a plurality of magnetic amplifier means each including magnetic element means, input winding means, and a plurality of output winding means, a plurality of magnetic information translating means each including winding means, separate unidirectional impedances coupling a terminal of each of said information winding means to said output winding means of a different one of said amplifier means, said unidirectional impedances being poled so that each of said information winding means is energized in respectively opposite directions by the associated ones of said output winding means, means for alternately applying energizing signals to said output windings of each of said amplifier means in the forward directions of the respective ones of said unidirectional impedances so as to tend to energize the associated one of said information winding means in opposite directions respectively, signal responsive magnetic switch means having an output winding for coupling said signal applying means to another terminal of each of said information translating means, means for applying switching signals to said switch means to control the passage of said energizing signals through said switch output winding, and means for selectively energizing said amplifier input winding means to control the passage of said energizing signals through said amplifier output winding means to energize a selected one of said information winding means.

17. A selecting system comprising a plurality of magnetic control means each including magnetic element means having substantial remanence, input winding means, and a plurality of output winding means, a plurality of magnetic information translating means each including selection winding means, separate unidirectional impedances coupling a terminal of each of said selection winding means to said output winding means of a different one of said amplifier means, said unidirectional impedances being poled so that each of said information winding means is energized in opposite directions respectively via the associated ones of said output winding means, means for alternately applying energizing pulses at certain times to said output windings of each of said control means in the forward directions of the respective ones of said unidirectional impedances so as to tend to energize the associated one of said selection winding means in opposite directions respectively, means for coupling said pulse applying means to another terminal of each of said selection winding means, and means for selectively energizing said input winding means at times between said certain times to set the remanent state of said magnetic element means thereby to control the passage of said energizing pulses through said output winding means to energize a selected one of said selection winding means.

18. In combination with a coincident-current magnetic memory including a plurality of binary magnetic information storage means each having drive winding means, a selection system therefor comprising a plurality of drive systems for providing coincident current drive, each of said drive systems comprising a plurality of magnetic control means each including magnetic element means having substantial remanence, input winding means, and a plurality of output winding means, separate unidirectional impedances coupling a terminal of each of said drive winding means to said output winding means of a different one of said control means, said unidirectional impedances being poled so that each of said drive winding means energized in opposite directions respectively by way of the associated ones of said output winding means, means for alternately applying energizing pulses at certain times to said output windings of each of said control means in the forward directions of the respective ones of said unidirectional impedances so as to tend to energize the associated one of said drive winding means in opposite directions respectively, means for coupling said pulse applying means to another terminal of each of said drive winding means, and means for selectively energizing said input winding means at times between said certain times to set the remanent state of said magnetic element means thereby to control the passage of said energizing pulses through said output winding means to energize a selected one of said drive winding means.

19. In combination with a coincident-current magnetic memory including a plurality of binary magnetic information storage means each having selection winding means, said selection winding means being arranged in a plurality of different groups, a selection system for said memory comprising a plurality of first and a plurality of second magnetic control means, each of said control means including magnetic element means having substantial remanence, input winding means, and a plurality of output winding means, separate unidirectional impedances coupling a terminal of each of said selection winding means to said output winding means of a different one of said first control means, said unidirectional impedances being poled so that each of said selection winding means is energized in respectively opposite directions via the associated ones of said output winding means, means for alternately applying energizing pulses at certain times to said output windings of each of said first control means in the forward directions of the respective ones of said unidirectional impedances so as to tend to energize the associated one of said selection winding means in opposite directions respectively, a different one of said output winding means of said second control means coupling said pulse applying means to another terminal of each of said groups of selection winding means, and means for selectively energizing said input winding means of said first and second control means at times between said certain times to set the remanent states of said magnetic element means to control the passage of said energizing pulses through said output winding means of said first and second control means thereby to energize a selected one of said selection winding means.

20. A switching system comprising a plurality of load impedances, means including first and second pluralities of lines interconnecting said load impedances thereby to effect an impedance matrix, a plurality of bidirectional magnetic amplifiers each of which has an input and a pair of outputs, said amplifiers each being selectively responsive to signals applied at its input for effecting output potentials of opposite polarity respectively at the said pair of outputs thereof, means including a pair of oppositely poled rectifiers coupling each of said first plurality of lines to the pair of outputs respectively of one of said amplifiers, control means coupled to each of said pairs of rectifiers for rendering a selected one only of each pair of rectifiers conductive upon occurrence of said pair of opposite polarity outputs from the bidirectional amplifier coupled thereto, a plurality of switching elements coupled respectively to said second plurality of lines, each of said switching elements being selectively bidirectionally conductive, and control means coupled to selected ones of said switching elements for controlling the state of conductivity of selected ones of said switching elements.

21. The system of claim 20 wherein each of said switching elements comprises a pulse-type magnetic amplifier.

22. The system of claim 20 wherein said plurality of load impedances comprises a plurality of selecting lines for memory elements in an information storage system.

References Cited in the file of this patent

UNITED STATES PATENTS

| | | |
|---|---|---|
| 2,591,406 | Carter | Apr. 1, 1952 |
| 2,691,156 | Saltz | Oct. 5, 1954 |
| 2,717,965 | Ramey | Sept. 13, 1955 |
| 2,734,187 | Rajchman | Feb. 7, 1956 |
| 2,764,726 | Sanders | Sept. 25, 1956 |
| 2,822,532 | Thompson | Feb. 4, 1958 |

UNITED STATES PATENT OFFICE

CERTIFICATE OF CORRECTION

Patent No. 2,931,015 — March 29, 1960

Theodore H. Bohn et al.

It is hereby certified that error appears in the printed specification of the above numbered patent requiring correction and that the said Letters Patent should read as corrected below.

Column 12, line 15, for "respective one" read -- respective ones --; line 40, for "one of" read -- ones of --; column 13, line 42, for "means energized" read -- means is energized --.

Signed and sealed this 4th day of October 1960.

(SEAL)

Attest:

KARL H. AXLINE
Attesting Officer

ROBERT C. WATSON
Commissioner of Patents